Sept. 19, 1967   K. B. LOWE   3,342,075
VIBRATING MECHANISM
Filed Feb. 23, 1965   3 Sheets-Sheet 1

INVENTOR:
KEITH B. LOWE
BY John H. Sutherland
ATTORNEY.

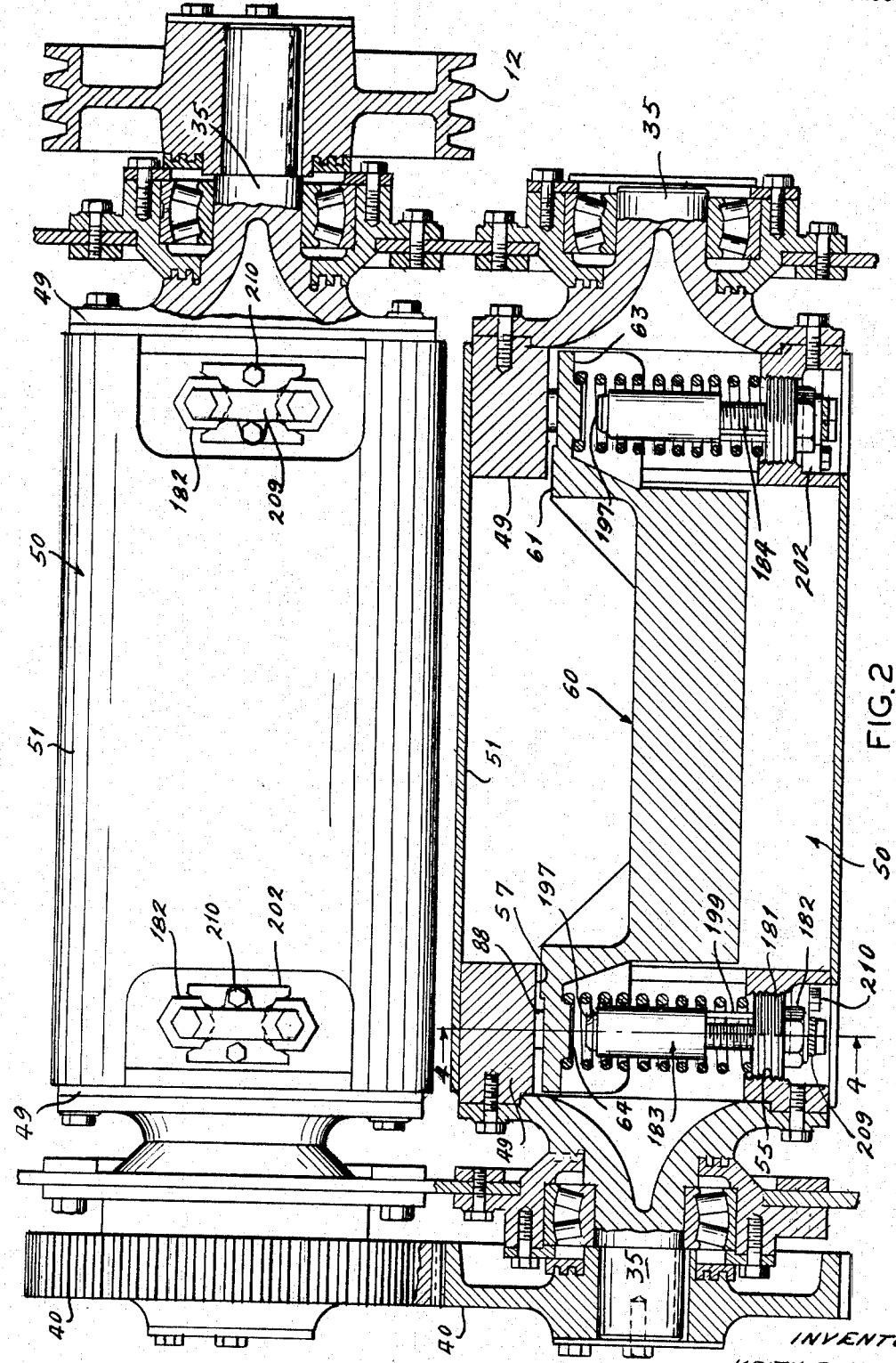

Sept. 19, 1967  K. B. LOWE  3,342,075
VIBRATING MECHANISM
Filed Feb. 23, 1965  3 Sheets-Sheet 3

INVENTOR:
KEITH B. LOWE
BY
ATTORNEY.

United States Patent Office 3,342,075
Patented Sept. 19, 1967

3,342,075
VIBRATING MECHANISM
Keith B. Lowe, Joplin, Mo., assignor to Missouri Rogers Corporation, a corporation of Missouri
Filed Feb. 23, 1965, Ser. No. 434,196
5 Claims. (Cl. 74—61)

This invention relates to vibrating mechanism adapted to use on feeders, grizzlies, screens and the like. It will be described hereinafter as applied to a feeder-grizzly, but its utility is by no means confined thereto.

Two kinds of vibrators for screens which are in common commercial use are the so-called "Symons" vibrator assembly, produced by Nordberg Mfg. Company, and the Pollitz vibrator, exemplified by Pollitz U.S. Patent No. 2,312,477. In the Symons vibrator assembly, a weight is saddle-mounted on a heavy solid shaft in such a way as to be shiftable radially outwardly against the bias of springs which tend to hold the weight against the shaft. When the shaft, hence the weight, is rotated, the centrifugal force, increasing with the speed of rotation, acts to move the weight radially outward with respect to the rotation of the axis of the shaft, which produces an eccentricity, hence vibration. It can be seen that the resultant vibratory motion will be circular.

In the Pollitz vibrator, weights of fixed eccentricity are mounted on contra-rotating shafts, so that if the weights are given the proper phase relation, a substantially linear resultant motion is produced. One difficulty with this type of assembly is that as the weights are accelerated or decelerated, the frequency generated by the weights approaches, equals and then passes the natural frequency of the device to which they are attached. This produces, in the vicinity of the natural frequency, a very large and largely uncontrollable vibration, which leads to damage to the machine itself and to supporting or surrounding structure and plant.

One of the objects of this invention is to provide a vibrating mechanism capable of substantially linear vibration, which reaches operating speed smoothly, without untoward vibration.

Another object is to provide such a mechanism, which when used on a feeder, can be adjusted easily and quickly to provide a wider range of feed rates than has been possible with vibrating mechanisms known heretofore.

Still another object is to provide a vibrating mechanism which is relatively light as compared with vibrating mechanisms of similar capacity known heretofore, but which is less liable to wear.

Still another object is to provide a vibrator mechanism which, as applied to a feeder, can be made to stop feeding quickly and effectively.

Still another object is to provide such a vibrating mechanism with radially shiftable weights, in which the rotational speed at which the weights throw and the amount of throw of the weights may be varied independently of one another.

Other objects will become apparent to those skilled in the art in the light of the following description and accompanying drawing.

In accordance with this invention, generally stated, a vibrating mechanism is provided in which contra-rotating weights are arranged to move radially outwardly to provide eccentricity, hence vibration, only after the weights have passed the speed of rotation at which sympathetic vibrations with the natural frequency of the device to be vibrated would occur. The weights are mounted for their radial movement at their ends, closely adjacent bearings, so as to minimize shaft deflection. This in turn relieves the bearings and drive mechanisms, which normally includes gears by which contra-rotation and phase relation of the weights are accomplished.

The radial throw of the weights is readily adjustable, so as to control the amplitude of the vibration. When the mechanism is applied to a feeder, this permits wide variation in feed rate at a constant speed of rotation, though it does not preclude control of the feed rate by variation of the speed of rotation as well.

The weights are continually biased toward non-eccentric position by means which are adjustable independently of the adjustment of the amplitude.

In the preferred embodiment shown and described, the weights are carried by hollow cylindrical housings, driven through a stub shaft. The unmodified term "shaft" is used hereinafter broadly to include the cylindrical weight housing. The adjustment of the throw of the weights in the preferred embodiment is easily accomplished without dismantling the machine.

In the preferred embodiment, a two speed motor is utilized as the source of driving power, particularly in the applications in which the vibrator mechanism is attached to a feeder.

In the drawing,

FIGURE 2 is a sectional view taken along the line 2—2 of FIGURE 1, turned one hundred eighty degrees and showing a vibrating mechanism including a preferred form of adjustable stop means;

Figure 1:
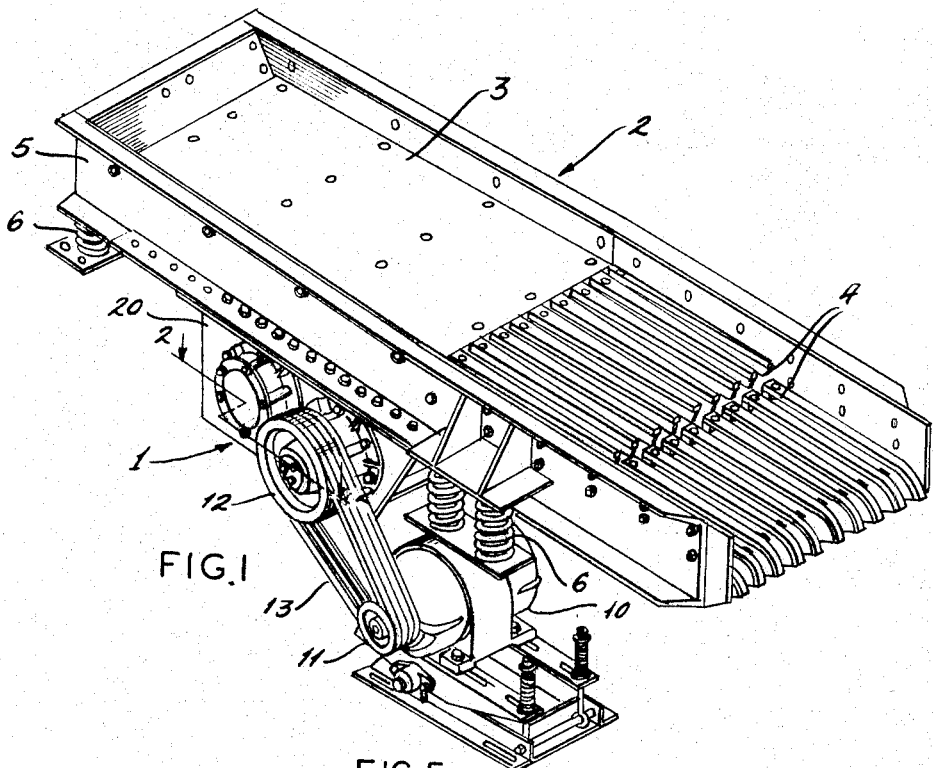
FIGURE 1 is a view in perspective of a feeder-grizzly equipped with one embodiment of vibrating mechanism of this invention.

Referring now to the drawing, reference numeral 1 indicates an assembled vibrating mechanism which, in FIGURE 1, is mounted on a feeder-grizzly 2. The feeder-grizzly 2 includes a feeder pan 3, a stepped grizzly 4, a feeder-grizzly frame 5 and mounting springs 6. The ultimate supporting structure for the feeder-grizzly, and the feed hopper and other appurtenances are not illustrated, forming no part of this invention.

The mechanism of this invention includes driving means which, in this illustrative embodiment includes a two speed electric motor 10, sheaves 11 and 12 and V-belts 13. The motor 10 is connected to a source of power through suitable, conventional switch means not here shown.

The vibrating mechanism 1, in this embodiment, includes a bearing supporting frame 20, bolted, through complementary flanges on the feeder-grizzly frame and bearing supporting frame, to the feeder-grizzly 2. It can be appreciated that the bearing supporting frame 20 can be made integral with the device of which the vibrating mechanism is to be a part.

The bearing supporting frame in this embodiment includes side plates 21, a pan 23, a gear case 24 bolted to one of the side plates 21, and gear case cover 25 bolted to the gear case 24.

Spherical roller bearings 30 are mounted in bearing housings 31, which in turn are mounted, at one side of the frame on the face of a side plate 21 and at the other, on the other side plate with the gear case 24. Stub shafts 35 are journaled in each of the bearings 30, and are secured at their inner ends to hub plates 36. At the gear case side, the shafts carry gears 40, by means of the usual keyway and key. The gears 40 mesh with one another and have the same number of teeth, so that once intermeshed, the phase relationship of the shafts will remain constant and the speed of rotation fo the two shafts is the same.

On the other side of the frame, one of the shafts 35 may be a short idler shaft. The other is provided with a keyway to mount the sheave 12. It is to be noted that the view in FIGURE 1 is the reverse of that shown in FIGURES 2 and 3, so as to illustrate, in FIGURE 1, the drive side of the device.

Inboard of the side plates 21, the hub plates 36 are bolted to heavy end rings 49 of hollow cylindrical weight housings 50. The weight housings 50 have a tubular wall 51 which is welded or otherwise secured to the end rings, and which is cut away at each end to expose tapped spring seat holes 55, oriented chordally, in the end rings. Each of the end rings is also provided with an axially directed square opening defined by oppositely disposed parallel walls 56 extending chordally with respect to the circular end ring, and parallel with the axis of the holes 55, and by parallel oppositely disposed walls 57, perpendicular to the walls 56. The walls 56 constitute a guideway and in practice are adapted to receive abrasion resistant wear plates, not here shown.

One of the walls 57 has in it bumper receiving wells 58, in which rubber weight supporting bumpers 59 are seated. The holes 55 extend through the opposite wall 57, and the wells 58 are axially aligned with the holes 55.

A weight 60 is slidably mounted within each of the weight housings 50. The weight 60 is elongated and is provided at both ends with identical guide trays 61, integral with the weight. The guide trays 61 include parallel sides 62 complementary to the walls 56 and adapted to fit in loosely slidable relation thereto, and a bearing surface 63 substantially perpendicular to the sides 62, and facing the holes 55. In the embodiment shown, the bearing surface 63 has a pair of bosses 64, axially aligned with the holes 55.

Figures 3, 4:
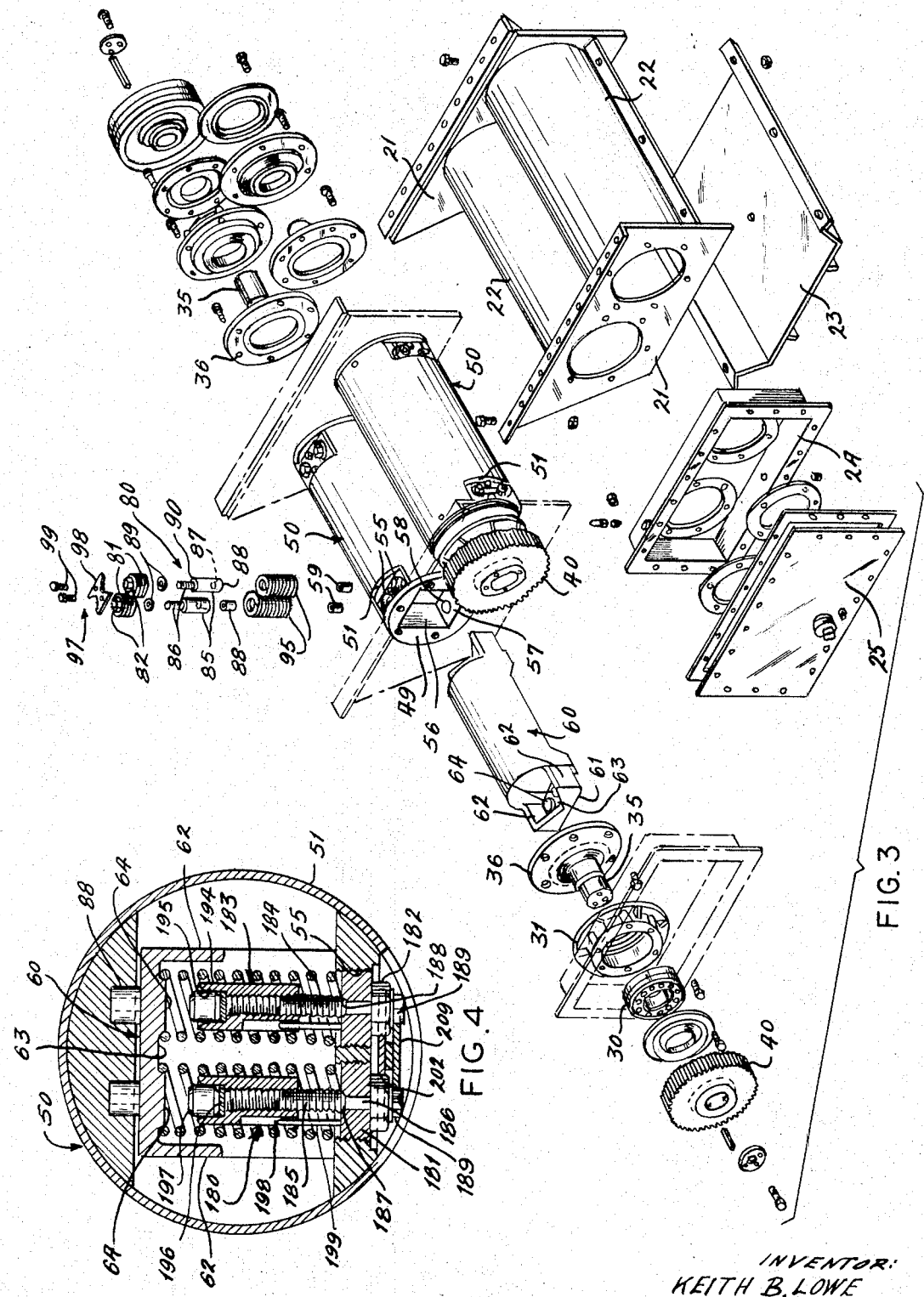
FIGURE 3 is an exploded view in perspective of a vibrating mechanism substantially as shown in FIGURE 2 but with another embodiment of adjustable stop means.
FIGURE 4 is a sectional view taken along the line 4—4 of FIGURE 2.

The end rings 49 carry a weight biasing and stop assembly the embodiment of which in FIGURE 3 is indicated by the reference numeral 80. Another embodiment is shown in FIGURES 2 and 4.

The bias and stop assembly 80 consists of four identical assemblies, two at each end of the weight housing, and each made up of an internally and externally threaded spring seat 81, provided with a polygonal boss 82 to permit its adjustment with a wrench, the spring seat 81 being threadedly mounted in one spring seat hole 55; a stop post 85 having a threaded section 86, of reduced diameter as compared with the body of the post, at its outer end, and a bumper-receiving well 87 at its inner end, in which a rubber bumper 88 is seated; one (or more) shim washers 89, of an inside diameter to clear the threaded section 86 of the post but to rest on a shoulder 90 defined between the section 86 and the body of the post; a helical spring 95 of a size to embrace the post 85 and to bear, at its outer end, against an undersurface of the spring seat 81, and at its inner end against the tray surface 63 around the boss 64, and clamping means 97, which, in this embodiment, take the form of a notched plate 9, adapted to engage the polygonal bosses 82 of two spring seats 81, and stud bolts 99, by which the plate is mounted on a flat peripheral surface of the end rings 49 between the holes 55.

In FIGURES 2 and 4, a bias and stop assembly 180 is illustrated. As in the assembly 80, the assembly 180 is made up of four identical assemblies, in each of which a spring seat 181 is threadedly mounted in a hole 55. The spring seat 181 is bored but is externally threaded only, and is provided with a polygonal boss 182 for adjustment in a direction in and out of the hole 55. A stop post 183 is made up of two parts, an externally threaded adjusting stud 184 and an internally threaded cylinder 194. The adjusting stud 184 has an externally threaded body 185, a neck 186 at the outer end of the body 185 and defining with the body 185 a shoulder 187 which is seated against a shoulder seating surface 188 on the inner side of the spring seat 181, and a polygonal cap 189, made integral with the neck 186 as by welding after the spring seat 181 is in place so that the adjusting stud 184 can be turned with a wrench. The internally threaded cylinder 194 has a counterbore 195 in its inner end to define an annular shoulder against which a disk 196 seats to support a resilient bumper 197 against movement into the internally threaded bore of the cylinder 194. The outer wall of the cylinder 195 has an axial keyway 198, in which a key 199, fixedly mounted at its outer end in the spring seat 199, slides. The key 199 restrains the cylinder 195 from rotation when the adjusting stud 184 is rotated relative to the spring seat 181.

A notched plates 202 engages the bosses 182 of adjacent spring seats, and a cap retaining plate 209 engages the caps 189 of adjacent adjusting studs. Both plates are retained by stud bolts 210.

Figure 5:
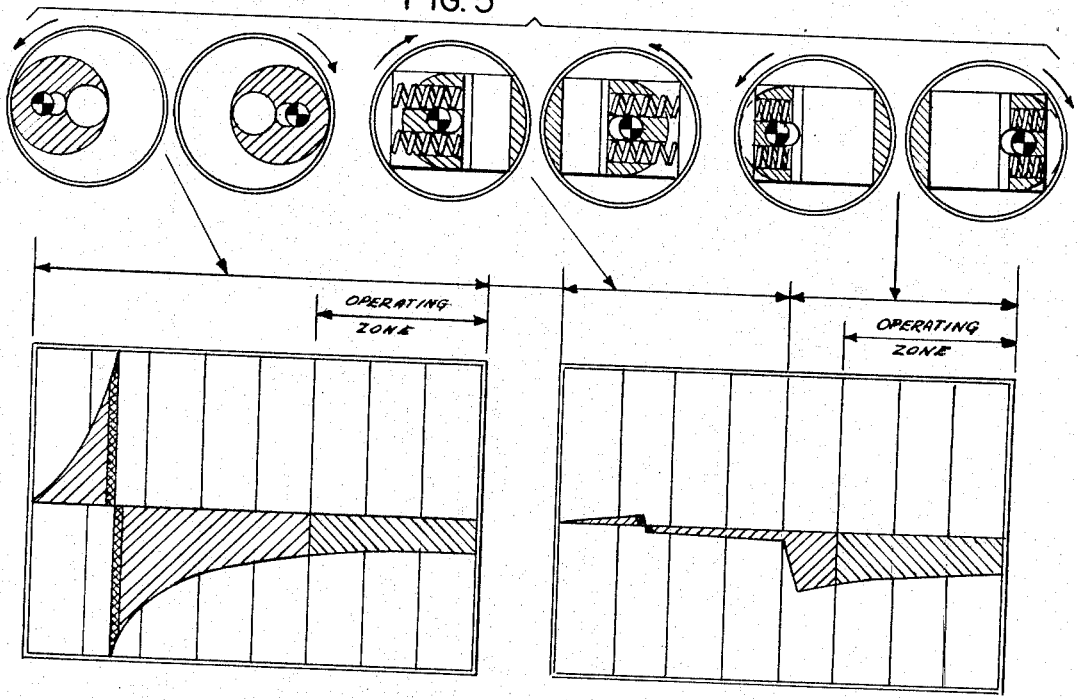
FIGURE 5 is a view partly schematic and partly graphic, illustrating the difference between the amplitude pattern of a typical device to which a vibrator of fixed eccentricity is attached and that of the vibrator of the present invention.

In the operation of vibrating mechanism of this invention as applied to the feeder-grizzly shown in FIGURE 1, it will be assumed that the compression of the springs 95 has been adjusted to the desired throw out point, by moving the spring seats 81 inwardly or outwardly with a torque wrench, and that the amplitude of the vibration has been predetermined by the proper positioning of the stop means, either by the insertion of the appropriate number of shim washers in the embodiment of stop means shown in FIGURE 3, or by adjustment of the adjusting stud 184 in the embodiment shown in FIGURES 2 and 4. The motor 10 is brought up to its higher speed. The weights 60, driven through the sheave 12 and the gears 40, rotate in fixed phase relationship and in opposite directions with respect to one another. When the speed of rotation has increased beyond the point at which the weights would produce sympathetic vibration with the natural frequency of the feeder-grizzly, centrifugal force causes the weights to move radially outwardly against the bias of the springs, in the guides defined by the parallel walls 56 in the end rings 49 until the tray bosses butt against the rubber bumpers of the stop posts. Merely by way of illustration, a feeder-grizzly of the type shown in FIGURE 1 may have a natural frequency of 200 cycles per minute. The compression of the spring is such that the weights throw out at about 400–450 cycles. The result of this arrangement is illustrated graphically in FIGURE 5. In that figure, the graph at the left represents the amplitude of vibration to be expected from contra-rotating weights of fixed eccentricity. The area of large amplitude, designated by the crosshatched area, represents the coincidence of the frequency of the weights and the natural frequency of the device. The graph on the right represents the practical operation of the device shown in FIGURE 1. A small break at the natural frequency of the device is indicated merely because, in practice, the weights may not be balanced so exactly as to eliminate all eccentricity at the lower speed. In this connection, it is to be noted that in practice, balance bars are secured in the weight housing to counter-balance the small amount of eccentricity of the weights which is required to place the center of gravity of each weight on the side of the axis of rotation of the housing toward which the weight is to move. If the center of gravity were coincident with or on the wrong side of rotation, the weight of course would not move out. The amount of radial outward movement of the weight is determined by the stop means. In either embodiment, the weight moves out until it hits the rubber bumpers on the inner end of the stop member. It can be seen that, in both embodiments, if the stop is moved in the direction of the weight to the place at which the stop prevents any radially outward movement of the weight, there will be substantially no vibration, hence no feed. Thus, in the vibrator of the present invention, the range of amplitude can be varied from zero to some predetermined maximum. This has not been possible with commercial vibrators in which the rate of feed has been governed by varying the frequency. In such devices, when the frequency drops below the point at which the material being conveyed is lofted against the force of gravity, the device becomes inoperative as a feeder.

In the embodiment of stop means shown in FIGURE 3 the amplitude is adjusted by removing the spring seats and stop posts, and adding or removing shim washers. The post is screwed up tight against the washers and the spring seats replaced. This requires also that the compression of the springs be reestablished.

In the embodiment shown in FIGURES 2 and 4 it is only necessary to remove the cap retainer 209, and move the cylinder 194 in or out by rotating the adjusting stud 184. The plate 202 prevents rotation of the spring seats while the caps 189, hence the studs 184, are rotated.

In both embodiments of stop and bias assembly, it can be seen that the compression of the spring and the position of the stop (i.e. the operating period of the weight and its throw) are adjustable independently of one another.

It can also be seen that in the construction of weight housing in the vibrating mechanism of this invention, the force exerted by the weights is transmitted to the stub shafts immediately adjacent the bearings. This arrangement, plus the use of the hollow housing, which has the effective resistance to deflection of a large solid shaft without the corresponding weight, permits the use of relatively light components.

In the application of the vibrating mechanism of this invention to a feeder, as illustrated in FIGURE 1, the use of a two-speed motor has been found quite desirable. The motor is brought up to its higher speed, which generates the operating frequency. When it is desired to stop the feed it is only necessary to switch the motor to the lower speed, which is below the throw-out speed of the weights. Any tendency of the revolving weights to overrun is controlled by the electrical braking action of the motor, so that feeding is stopped practically instantaneously. Feeding can, however, be resumed quickly, since the motor is already in operation at the lower speed.

Numerous variations in the construction of the vibrating mechanism of this invention, within the scope of the appended claims will occur to those skilled in the art in the light of the foregoing description.

Merely by way of example, a torsion bar may be used instead of the helical spring as the weight bias means; other synchronizing means besides gears may be used to insure contra-rotation and the maintenance of the proper phase relationship of the weight; yoke type guide members may be used at the ends of the weights and in the end rings of the housing, and a shaft may extend along the weight between the bearings, with force transmitting means connected to it adjacent the bearings. These are merely illustrative.

Having thus described the invention, what is claimed and desired to be secured by Letters Patent is:

1. A vibrating mechanism adapted to use on a feeder, grizzly, screen or the like, comprising a bearing supporting frame, bearings supported by said frame, two spaced hollow cylindrical weight housings connected to and between stub shafts journaled in said bearings, means for driving said weight housings in contra-rotation and in predetermined phase relationship with respect to one another, each of said weight housings being provided with a weight guide at each end, defined by parallel, chordally directed walls, an elongated weight mounted within said weight housing, said elongated weight being provided with a complementarily parallel-sided guide tray at each end, slidably received within the said weight guide, whereby said weight is slidably mounted at its ends adjacent the said bearing, for movement radially with respect to the axis of the weight housing, biasing means mounted to exert on the weight a continuous bias toward the axis of rotation of the weight housing, and adjustable stop means for limiting the outward radial movement of the weight, the said biasing means being of such strength as to permit substantial radial outward movement of the weight only at a speed of rotation of the housing at which the frequency generated by the weight is higher than the natural frequency of the device to which the mechanism is to be attached.

2. The mechanism of claim 1 wherein the said guide tray provides stop and spring bearing surfaces substantially at right angles to the parallel guide tray sides.

3. The mechanism of claim 2 wherein the weight housing is provided at each end with internally threaded holes the axis of which is substantially parallel to the guide walls and chordally aligned with the weight tray surface, and the adjustable biasing and stop means include an externally threaded spring seat threadedly mounted in said holes, a threaded post member extending within the compass of said spring seat, projecting inwardly therefrom and adjustable with respect thereto in the direction of its projection, and a coil spring embracing said post and bearing against said guide tray surface.

4. The mechanism of claim 3 wherein the threaded post member includes an internally threaded cylinder, an externally threaded adjusting stud having a part seated against a surface of the spring seat, a part accessible from outside said housing and a part threadedly engaging the cylinder, and means for restraining rotation of the cylinder with rotation of said stud.

5. In a vibratory mechanism of the character described, the improvement comprising a closed ended, hollow, cylindrical, elongated weight housing journaled for rotation about its long axis; means for rotating said weight housing; an elongated weight mounted in and carried by said weight housing for rotary movement with said weight housing and radial movement with respect to the axis of rotation of said weight housing and positioned at rest at a substantially balanced position with respect to the axis of rotation of the weight housing; weight biasing means within said housing and bearing on said weight to bias said weight to its substantially balanced position; stop means within said housing and positioned to bear upon said weight when said weight moves radially outwardly against the bias of said biasing means, and means accessible from outside the housing for moving said biasing means and stop means independently for adjustment of the amount of bias and degree of throw of the weight.

References Cited

UNITED STATES PATENTS

| | | | |
|---|---|---|---|
| 2,063,509 | 12/1936 | Lacy | 74—61 |
| 2,286,770 | 6/1942 | Symons | 74—61 X |
| 2,728,614 | 12/1955 | Rink | 74—61 X |
| 2,861,458 | 11/1958 | Awedissjan | 74—87 |
| 2,989,869 | 6/1961 | Hanggi | 74—61 |

MILTON KAUFMAN, *Primary Examiner.*

FRED C. MATTERN, *Examiner.*

F. E. BAKER, *Assistant Examiner.*